(12) United States Patent
Wehrenberg (10) Patent No.: US 9,158,130 B2
(45) Date of Patent: Oct. 13, 2015

(54) APPARATUS AND METHOD FOR MULTI-FOCUS LENS SYSTEM

(71) Applicant: Paul J. Wehrenberg, Palo Alto, CA (US)

(72) Inventor: Paul J. Wehrenberg, Palo Alto, CA (US)

(*) Notice: Subject to any disclaimer, the term of this patent is extended or adjusted under 35 U.S.C. 154(b) by 0 days.

(21) Appl. No.: 14/570,251

(22) Filed: Dec. 15, 2014

(65) Prior Publication Data

US 2015/0168744 A1 Jun. 18, 2015

Related U.S. Application Data

(60) Provisional application No. 61/963,852, filed on Dec. 16, 2013.

(51) Int. Cl.
*G02C 3/00* (2006.01)
*G02C 7/10* (2006.01)
*G02C 7/14* (2006.01)
*G02C 7/08* (2006.01)
*G02B 3/14* (2006.01)

(52) U.S. Cl.
CPC . *G02C 7/085* (2013.01); *G02B 3/14* (2013.01)

(58) Field of Classification Search
CPC .............. G02C 7/14; G02C 7/02; G02B 3/14; G02B 26/005

USPC ............................... 351/159.58; 359/665–668
See application file for complete search history.

(56) References Cited

U.S. PATENT DOCUMENTS

| | | | | |
|---|---|---|---|---|
| 3,371,979 A * | 3/1968 | Catanzaro | | 351/49 |
| 3,614,215 A | 10/1971 | Mackta | | |
| 4,174,156 A * | 11/1979 | Glorieux | | 351/159.41 |
| 4,181,408 A * | 1/1980 | Senders | | 351/159.68 |
| 4,477,158 A * | 10/1984 | Pollock et al. | | 351/159.04 |
| 6,288,846 B1 * | 9/2001 | Stoner, Jr. | | 359/666 |
| 7,453,646 B2 * | 11/2008 | Lo | | 359/665 |
| 2003/0095336 A1 * | 5/2003 | Floyd | | 359/665 |
| 2008/0231799 A1 * | 9/2008 | Iuliano | | 351/161 |

* cited by examiner

*Primary Examiner* — James Greece
(74) *Attorney, Agent, or Firm* — Kaplan Breyer Schwarz & Ottesen, LLP (57) ABSTRACT

Apparatus and methods for a two-lens optical system having a focal length that can be readily switched between a first focal length and a second focal length. The system includes first and second multi-element lenses, each of which includes a cavity for a fluid. The first lens has the first focal length in the absence of the fluid in its cavity and the second focal length when the fluid is present in its cavity. The second lens has the second focal length in the absence of the fluid in its cavity and the first focal length when the fluid is present in its cavity. The focal length of the optical system is controlled by controlling which cavity of the two lenses contains the fluid.

23 Claims, 11 Drawing Sheets

APPARATUS AND METHOD FOR MULTI-FOCUS LENS SYSTEM

CROSS REFERENCE TO RELATED APPLICATIONS

This case claims priority of U.S. Provisional Patent Application Ser. No. 61/963,852, filed Dec. 16, 2013, which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to optics in general, and, more particularly, to optical systems having multiple focal lengths.

BACKGROUND OF THE INVENTION

Presbyopia is a vision condition wherein the eye has a progressively reduced ability to focus on nearby objects. It is typically thought to arise from a loss of flexibility of the lens within the eye. Presbyopia affects the majority of human beings as they age, typically becoming noticeable when a person reaches their mid-forties.

Presbyopia, by itself, can be corrected in a straightforward manner using corrective eyeglasses, such as reading glasses. When a person is afflicted with both presbyopia and another condition that requires the use of corrective eyeglasses (e.g., myopia), however, vision correction becomes more complicated.

The most common prior-art correction for presbyopia in a patient that requires eyeglasses for another condition involves eyeglass lenses with different focal lengths in different areas of the lens. Examples of such lenses include "bifocals," which incorporate two different focal-length regions, "trifocals," which incorporate three different focal-length regions, and "progressive lenses," which incorporate a continuum of focal lengths. Typically, the lower part of these lenses incorporates the shorter focal length region allowing focus on near objects in the lower part of the field of view.

Unfortunately, such an optical configuration does not support focusing on nearby objects in the middle or upper part of the field of view. As a result, the eyeglass wearer must tilt their head backward to clearly see a nearby object located directly in front of the face. Often, the required tilt angle leads to patient discomfort.

Further, for progressive lens designs, it is normally necessary to make compromises that give rise to a significantly reduced width of the in-focus field of view at near distances.

In another prior-art approach for correction of presbyopia, eyeglass frames include deformable lenses whose shape is fluidically controlled. Each lens comprises a fluid that is encapsulated either between two deformable transparent membranes or a single deformable membrane and a rigid lens or plate. The shape of the lens is controlled by pumping the fluid into or out of the cavity of each lens.

Unfortunately, it is difficult to control of the membrane deformation to avoid gross distortion of the image. Typically, the lens shape is restricted to circular, since circular lenses tend to deform in a radially symmetric fashion. The need for circular lenses, however, is undesirable as many eyeglass wearers do not wish to be constrained to round lenses.

In addition, membrane deformation systems require one or more fluid reservoirs, as well as pump systems for pumping fluid in and out of the lens cavities to control their focal lengths. These pumping systems add weight and bulk to the eyeglass frames making them less comfortable for the user—particularly when worn for long periods of time. Further, the style and attractiveness of eyewear is strongly dependent on the design of their frames. Requiring fluid reservoirs and/or pumps in the frames limits the eyewear design space and can dramatically detract from their look and marketability.

An eyeglass system having lenses whose focal length is controllable across their entire clear aperture, can have any desired lens shape, and retain a broad design space for eyewear frames, would be a significant advance in the state-of-the-art of vision correction.

SUMMARY OF THE INVENTION

The present invention enables vision correction via a multi-focal-length, two-lens optical system that is suitable for use in eyeglasses. Each lens has a focal length that can be changed, across its entire aperture, between a relatively shorter focal length and a relatively longer focal length. The focal length of each lens is dependent upon the presence or absence of a fluid within a reservoir included in the lens. To change between the two focal lengths of the optical system, the fluid is transferred from one lens to the other. Embodiments of the present invention are particularly well suited for use in eyewear for people that require vision correction for both near vision and distance vision.

An illustrative embodiment is an eyewear system comprising first and second lenses that are held in eyeglass frames, where each lens is a multi-element lens having substantially rigid front and back lens elements. The front and back lens elements collectively define a cavity between them, where the cavity can contain a fluid, and where each cavity has substantially the same volume. The two cavities are fluidically coupled via a conduit operative for conveying the fluid between them. The fluid is contained in only the two cavities and, in some embodiments, the conduit between them. As a result, a separate reservoir for the fluid is not required in the eyeglass frames.

The first lens is designed such that it has a first focal length when its cavity is fluid-free and a second focal length when its cavity is filled with the fluid. The second lens is designed such that is has the second focal length when its cavity is fluid-free and the first focal length when it is filled with the fluid. The focal length of the optical system is controlled by controlling which cavity of the two lenses contains the fluid. In a first state, wherein the second lens contains the fluid, each lens (and the optical system) has the first focal length. In a second state, wherein the first lens contains the fluid, each lens (and the optical system) has the second focal length.

In some embodiments, the lenses are designed to accommodate a user having different vision correction needs in each eye. As a result, in at least one of the first state and second state, the two lenses have different focal lengths, where the difference is based on the correction necessary for each eye.

In some embodiments, fluid is transferred between the first and second lens by tilting the eyeglasses to induce gravity feed. In some embodiments, a second conduit fluidically couples the first and second lens to enable "venting" of gas from the lens being filled with fluid. In some embodiments, the fluid is transferred between the lenses via a pumping mechanism, such as a manual bellows pump, a hydraulic pump, etc. In some embodiments, fluid is transferred between the lenses by changing the volume of one or both of the cavities. Some embodiments of the present invention include a fluid reservoir that is external to the first and second lenses.

In some embodiments, one of the lenses includes a first fluid and the second lens includes a second fluid, where the first and second fluids are immiscible, and where each of the first and second fluids has a different index of refraction. In some embodiments, one of the first and second fluids is electrically conductive.

In some embodiments, a lens includes a first cavity and a second cavity, wherein the focal length of the lens is based on the fluids in each cavity. In some embodiments, the lens has a first focal length when the first cavity contains the first fluid and the second cavity contains the second fluid. The focal length of the lens is changed to a second focal length by exchanging the fluids in the two cavities. In some embodiments, the focal length of the lens is changed to the second focal length by reducing the volume of the first cavity to drive some of the first fluid into the second cavity such that both cavities are filled with the first fluid. The focal length of the lens is returned to the first focal length by restoring the first cavity to its original volume thereby drawing the first fluid from the second cavity and enabling the second cavity to refill with the second fluid.

An embodiment of the present invention is an optical system comprising a first lens having a plurality of lens elements, the lens elements defining a first cavity, wherein the first lens has a first focal length when the first cavity contains a first fluid, and wherein the first lens has a second focal length when the first cavity is substantially first-fluid free.

DETAILED DESCRIPTION

Figure 1:
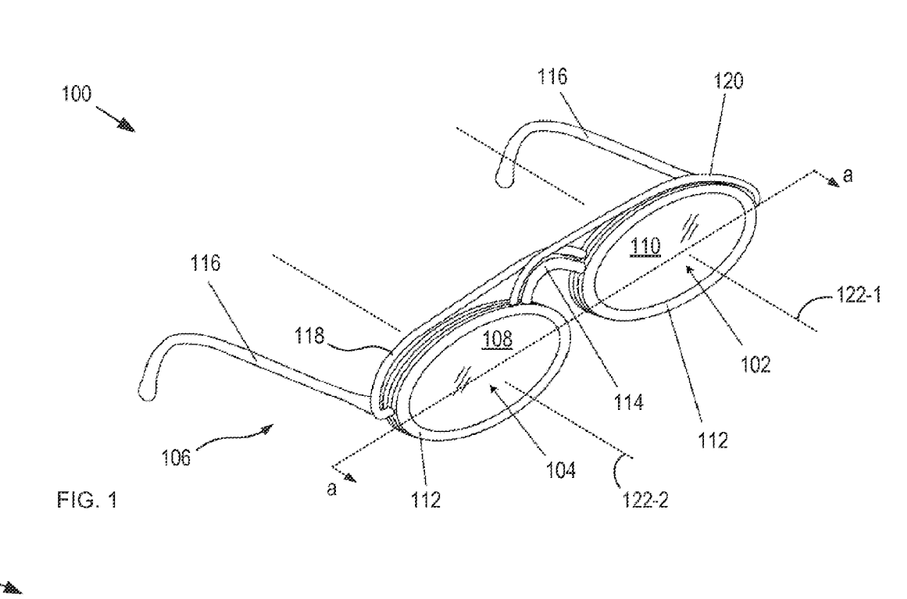
FIG. 1 depicts a schematic drawing of a perspective view of an eyeglass system in accordance with an illustrative embodiment of the present invention.

FIG. 1 depicts a schematic drawing of a perspective view of an eyeglass system in accordance with an illustrative embodiment of the present invention. System 100 includes lenses 102 and 104, frames 106, and fluids 108 and 110. System 100 is a set of eyeglasses having a focal length that can be switched between a first focal length, f1, suitable for near vision, and a second focal length, f2, suitable for distance vision.

Although the illustrative embodiment is an optical system for vision correction, it will be clear to one skilled in the art, after reading this Specification, how to specify, make, and use alternative embodiments of the present invention that are suitable for use in applications other than vision correction, such as stereoscopic applications, stereo microscopes, surveillance systems, etc. It should be noted, therefore, that focal lengths f1 and f2 are not limited to focal lengths suitable for near- and distance-vision correction but can have any desired, practical values without departing from the scope of the present invention.

Each of lenses 102 and 104 is a multi-element lens comprising a pair of substantially rigid lens elements that define a cavity between them. Lens 102 is centered on optical axis 122-1 and lens 104 is centered on optical axis 122-2.

Frames 106 include conventional mechanical elements typical of eyewear (i.e., rims 112, temples 116, nose bridge 114), as well as conduits 118 and 120, which enable fluid 108 to transfer between lenses 102 and 104. It should be noted that the present invention is suitable for use with virtually any type of eyeglass frames, including, without limitation, frames with rims that completely or partially surround lenses 102 and 104, rimless frames, etc.

Fluid 108 is glycerol in liquid phase, which has a refractive index, $I_{r1}$, of approximately 1.5. In some embodiments, fluid 108 is another substantially transparent fluid having any suitable refractive index, such as water, glycerin, alcohol, etc., selected such that its refractive index facilitates the design of lenses 102 and 104, as discussed below.

Fluid 110 is air, which has a refractive index, $I_{r2}$, of approximately 1.0. In some embodiments, fluid 110 is another substantially transparent gas-phase fluid, such as helium, argon, forming gas, etc., selected such that its refractive index facilitates the design of lenses 102 and 104. In some embodiments, fluid 110 is a liquid-phase fluid having a different refractive index than fluid 108. In some embodiments, fluid 110 has a different density and fluids 108 and 110 are immiscible. Embodiments wherein fluid 110 is in liquid phase provide the user with a balanced eyewear configuration, among other advantages.

One skilled in the art will recognize, after reading this Specification, that the refractive index for fluids 108 and 110 is a matter of design choice and that the design of lenses 102 and 104 can be tailored to accommodate fluids having a wide range of refractive indices.

Figure 2A:
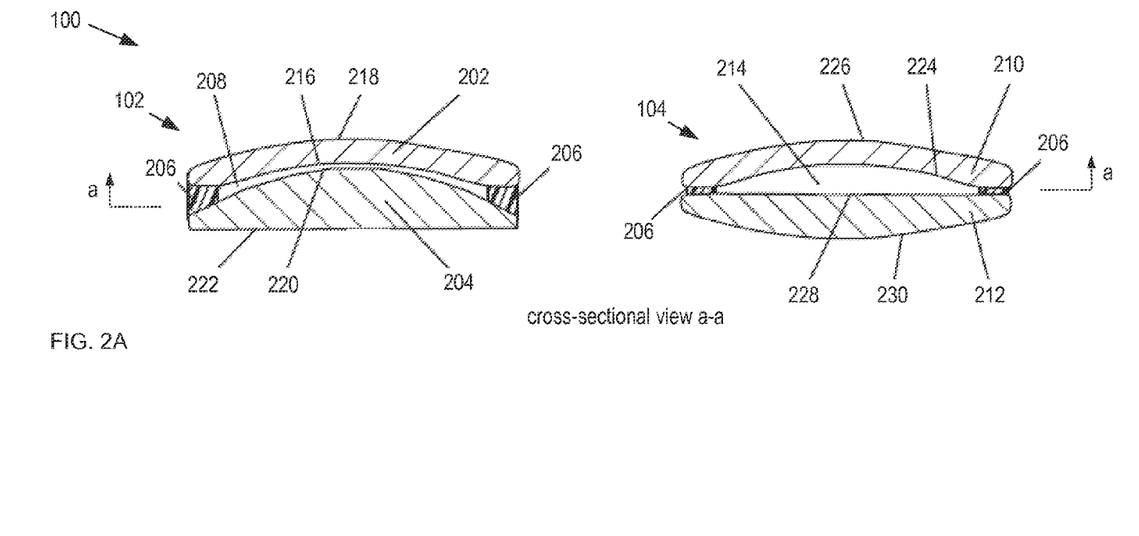
FIG. 2A depicts a schematic drawing of a cross-sectional view of lenses 102 and 104 in accordance with the illustrative embodiment.

FIG. 2A depicts a schematic drawing of a cross-sectional view of lenses 102 and 104 in accordance with the illustrative embodiment. The cross-sectional view of lenses 102 and 104 is view a-a, as shown in FIG. 1. For clarity, the elements of frames 106 and fluids 108 and 110 are not shown in FIG. 2A.

Lens 102 includes substantially rigid lens elements 202 and 204 and seal 206, which collectively define cavity 208.

Lens 104 includes substantially rigid lens elements 210 and 212 and seal 206, which collectively define cavity 214.

In the illustrative embodiment, each of lens elements 202, 204, 210, and 212 is a molded plastic refractive lens made of a lightweight crown-glass-equivalent plastic having a refractive index of approximately 1.5.

Seal 206 is a compliant, resilient, non-porous ring having a shape matched to the perimeter of lenses 102 and 104. Seal 206 provides a fluid-tight seal between the lens elements of each lens. In some embodiments, seal 206 comprises a rigid material and has a shape matched to the perimeter of lenses 102 and 104. Materials suitable for use in seal 206 include, without limitation, rubbers, polymers (e.g., neoprene, etc.), plastic, metal, and the like.

The design of lenses 102 and 104 is complimentary such that: (1) lens 102 has the first focal length, f1, when cavity 208 contains fluid 110 and the second focal length, f2, when cavity 208 contains fluid 108; and (2) lens 104 has focal length f2 when cavity 214 contains fluid 110 and focal length f1 when cavity 214 contains fluid 108. The lens elements that compose lenses 102 and 104 are designed to satisfy these design constraints given the refractive index of fluids 108 and 110.

One skilled in the art will recognize that, because the refractive indices of the lens elements and fluid 108 are the same, when the fluid fills one of cavities 208 and 214, that lens acts as a single-element lens. In some embodiments, fluids 108 and 110 are selected such that neither has a refractive index that matches that of lens elements 202, 204, 210, and 212. One skilled in the art will recognize that a cavity filled with a fluid whose refractive index is unmatched to that of adjacent lens elements is, itself, a lens element.

Using the lens maker's equation for thin lenses and the index of refraction of fluids 108 and 110 (i.e., $I_{r1}$=1.5 and $I_{r2}$=1.0), an exemplary design for lenses 102 and 104 having focal lengths of f1 and f2 (based on the location of fluids 108 and 110) can be readily determined.

Lens element 202 has surfaces 216 and 218, each of which has a radius of curvature equal to f1.

Lens element 204 has surfaces 220 and 222. Surface 220 has a radius of curvature that is equal to half of that of surfaces 216 and 218 (i.e., ½*f1). Surface 222 has a radius of curvature that is equal to infinity (i.e., it is a flat surface). As a result, when cavity 208 contains fluid 108, the focal length of lens 102 is equal to 2*f1. Thus the value of f2 is 2*f1 in this example. When cavity 208 does not contain fluid 108, the focal length of lens 102 is equal to f1.

Lens element 210 has surfaces 224 and 226, each of which also has a radius of curvature equal to f1.

Lens element 212 has surfaces 228 and 230. Surface 228 has a radius of curvature that is equal to infinity, while surface 230 has a radius of curvature that is equal to f1. As a result, when cavity 214 contains fluid 108, the focal length of lens 104 is equal to f1 and when cavity 208 does not contain fluid 108, the focal length of lens 102 is equal to f2.

Figure 2B:
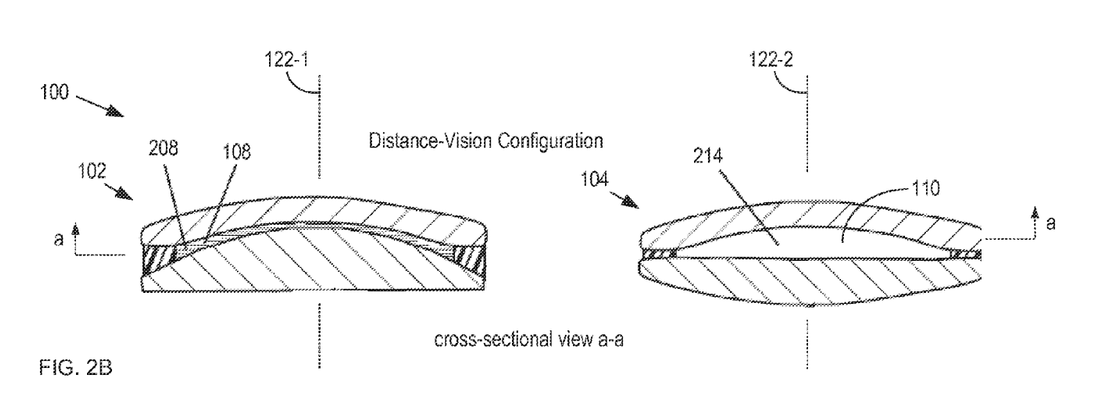
FIG. 2B shows a cross-sectional view of system 100 configured for distance-vision correction.

FIG. 2B shows a cross-sectional view of system 100 configured for distance-vision correction. In a distance-vision configuration, cavity 208 of lens 102 is filled with fluid 108 and cavity 214 of lens 104 is filled with fluid 110. As discussed above, the design of lenses 102 and 104 is such that when lens 102 is filled with the fluid having the relatively higher refractive index and lens 104 is filled with the fluid having the relatively lower refractive index, both lenses have the relatively longer focal length, f2.

Figure 2C:
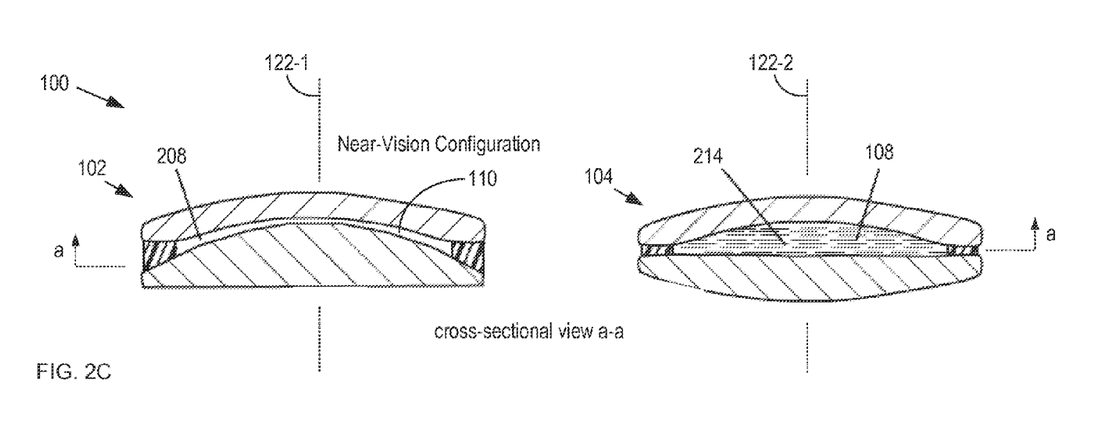
FIG. 2C shows a cross-sectional view of system 100 configured for near-vision correction.

FIG. 2C shows a cross-sectional view of system 100 configured for near-vision correction. In a near-vision configuration, cavity 208 of lens 102 is filled with fluid 110 and cavity 214 of lens 104 is filled with fluid 108. As discussed above, the design of lenses 102 and 104 is such that when lens 102 is filled with the fluid having the relatively lower refractive index and lens 104 is filled with the fluid having the relatively higher refractive index, both lenses have the relatively shorter focal length, f1.

Figure 3:
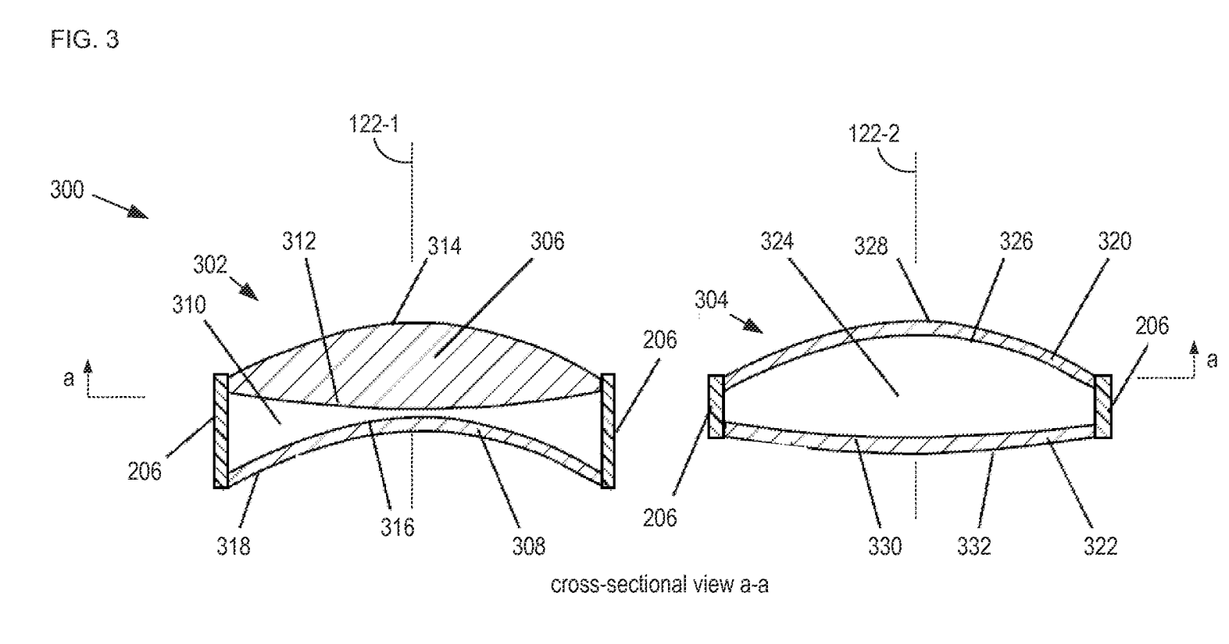
FIG. 3 depicts a schematic drawing of a cross-sectional view of an alternative lens design for system 100.

FIG. 3 depicts a schematic drawing of a cross-sectional view of an alternative lens design for system 100. Lens design 300 includes lenses 302 and 304, which are analogous to lenses 102 and 104. Lens design 300 is an exemplary design having a first focal length f3 and a second focal length f4, where f3 is substantially infinity (suitable for distance vision) and f4 is appropriate for near-vision correction. Second focal length, f4, can be expressed as a function of the radii of curvature of the lens element surfaces 312, 314, 316, 318, 326, 320, 330, and 332, as described below.

Lens 302 includes lens elements 306 and 308 and seal 206, which collectively define cavity 310.

Lens element 306 has surfaces 312 and 314. Surface 312 has a radius of curvature equal to R1 and surface 314 has a radius of curvature R2.

Lens element 308 has surfaces 316 and 318. Each of surfaces 316 and 318 has a radius of curvature that is equal to R2.

Lens 304 includes lens elements 320 and 322 and seal 206, which collectively define cavity 324. It should be noted that, in this embodiment the length of the seal 206 in the direction of the optical axis can be different for lens 302 and lens 304, and thus cavities 310 and 324 can be formed to have substantially the same volume.

Lens element 320 has surfaces 326 and 328, each of which also has a radius of curvature equal to R2.

Lens element 322 has surfaces 330 and 332. Each of surfaces 330 and 332 has a radius of curvature that is equal to R1.

Again using the lens makers' equation and fluids 108 and 110, when fluid 108 is in cavity 324, the focal length f4 of both of lenses 302 and 304 is substantially equal to $[2\times(R1)\times(R2)]/[(R1)+(R2)]$.

For the purposes of illustration, an exemplary design of lens system 300 is provided here, wherein a value of f4 suitable for near-vision correction is chosen to provide 2 diopters of focusing power. Focal length f4, therefore, is equal to 0.5 meters. Based on lens elements of crown-glass equivalent plastic (refractive index ~1.5), R2 is selected as 0.33 meter, which gives a value for R1 as 1.00 meter.

It should be noted that the lens designs provided here are merely exemplary and that one of ordinary skill in the art will recognize that myriad lens designs are possible without departing from the scope of the present invention. Further, in some embodiments, the design of at least one of lenses corrects for other vision problems, such as astigmatism or other optical aberrations. In some embodiments, the choices of the design parameters of lens system 300 are made on the basis of their impact on the appearance of an eyeglass system in which they are incorporated.

Although the lens elements of lenses 102 and 104 are made of a crown-glass-equivalent plastic, it will be clear to one skilled in the art, after reading this Specification, how to specify, make, and use alternative embodiments of the present invention wherein at least one of lenses 102 and 104 includes at least one lens element made of another optical material, such as LF5 flint-glass-equivalent plastic, another optical-glass-equivalent plastic, crown glass, flint glass, another optical glass, etc. Further, although the lens elements of lenses 102 and 104 are refractive lens elements, in some embodiments, at least one of lens elements 202, 204, 210, and 212 is a diffractive lens element.

Returning now to FIG. 1, frames 106 comprise rims 112, nose bridge 114, temples 116, conduits 118 and 120.

Nose bridge 114 and temples 116 are conventional elements included in a typical set of eyeglass frames. In some embodiments, temples either contain or support an external reservoir (or reservoirs) for fluid 108, where the reservoir is fluidically coupled with cavities 208 and 214.

Rims 112 are plastic mechanical supports that surround and hold lenses 104 and 106. Rims 112 also includes ports at which conduits 118 and 120 fluidically couple to cavities 208 and 214 via channels formed through seal 206. In some embodiments, rims are made of a suitable material other than plastic, such as metal, ceramic, etc.

Each of conduits 118 and 120 is a thin, lightweight tube operative for enabling fluids 108 and 110 to transfer between cavities 208 and 214.

Conduits 118 and 120 are typically made of the same material as rims 112 to mitigate degradation of the attractiveness of system 100. In some embodiments, at least one of conduits 118 and 120 is made of another material to, for example, provide an accent feature to system 100.

Figure 4A:
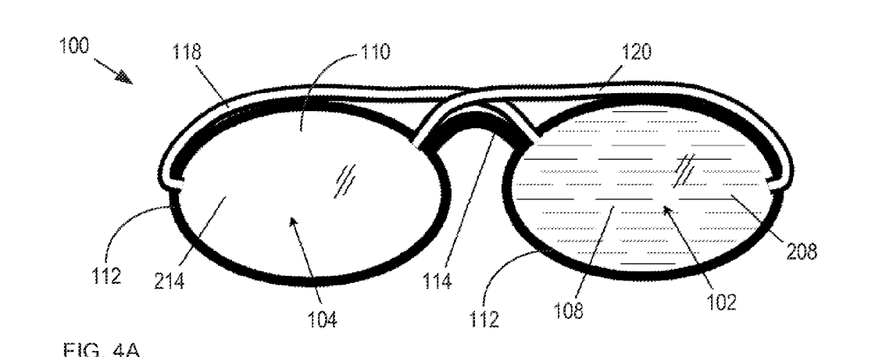
FIGS. 4A and 4B depict a schematic drawing of a front view of system 100, before and during transfer of fluids 108 and 110, respectively, in accordance with the illustrative embodiment.
Figure 4B:
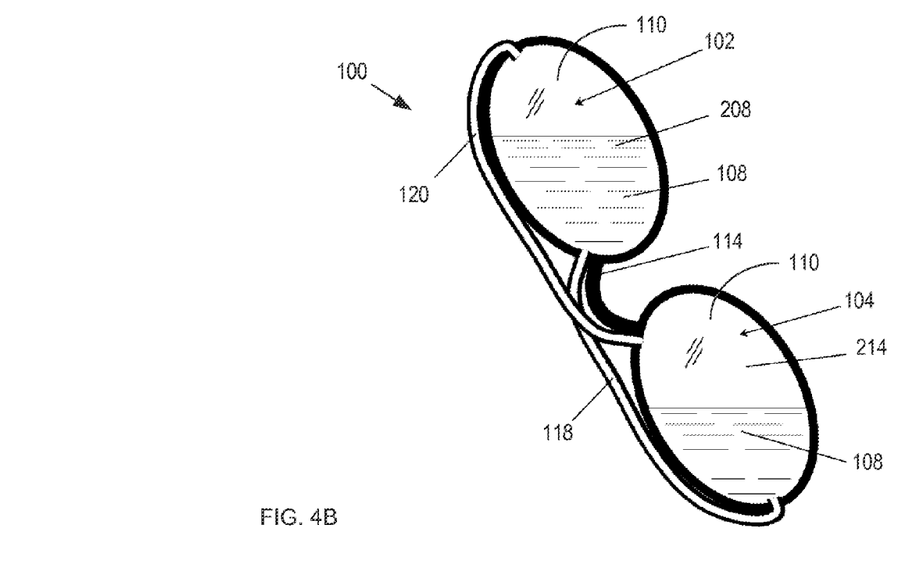

FIGS. 4A and 4B depict a schematic drawing of a front view of system 100, before and during transfer of fluids 108 and 110, respectively, in accordance with the illustrative embodiment.

As depicted in FIG. 4A, prior to its transfer, fluid 108 completely fills cavity 208. As a result, lens 102 has a focal length of f2. When system 100 is tilted, as shown in FIG. 4B, fluid 108 flows through conduit 118 into cavity 214, displacing fluid 110. As fluid 110 is displaced in cavity 214, it is forced through conduit 120 into cavity 208. After the transfer lens 102 has a focal length f1.

It should be noted that the design of conduits 118 and 120 provided here are merely exemplary. One skilled in the art will recognize, after reading this Specification, that many alternative designs and shapes of the conduits exist within the scope of the invention. Further, the use of dual conduits between lenses 102 and 104, as depicted, represents merely one approach for fluidically coupling the lenses and myriad alternative approaches are possible without departing from the scope of the present invention.

Further, in some embodiments of the present invention, frames 106 includes at least one vent that enables gas-phase fluid to flow between the atmosphere external to system 100 and at least one of cavities 208 and 214. In some of these embodiments, such a vent is included in at least one of conduits 118 and 120.

Figure 5A:
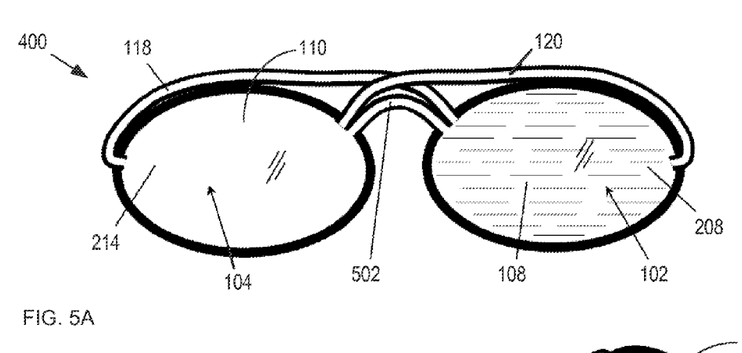
FIGS. 5A and 5B depict a schematic drawing of a front view of an optical system, before and during transfer of fluids 108 and 110, respectively, in accordance with a first alternative embodiment of the present invention.
Figure 5B:
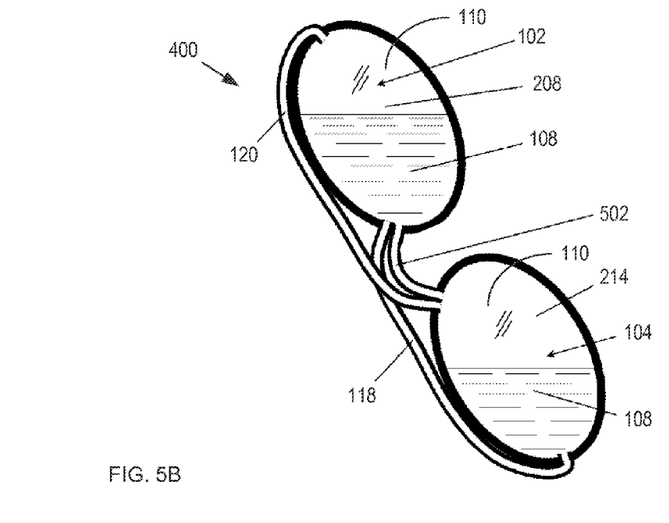

FIGS. 5A and 5B depict a schematic drawing of a front view of an optical system, before and during transfer of fluids 108 and 110, respectively, in accordance with a first alternative embodiment of the present invention. System 500 is analogous to system 100; however, system 500 also includes a third conduit that is integrated into the nose bridge of the eyeglass frames. System 500 includes lenses 102 and 104 and nose bridge 502.

Nose bridge 502 is analogous to conduits 118 and 120. Its inclusion in system 500 facilitates rapid flow of fluids 108 and 110 between the lens cavities as the fluids transfer from one lens to the other.

Although the illustrative embodiment comprises lenses having fluid cavities that have fixed volume, an ability to vary the volume of at least one lens cavity would be advantageous in some applications.

Figure 6A:
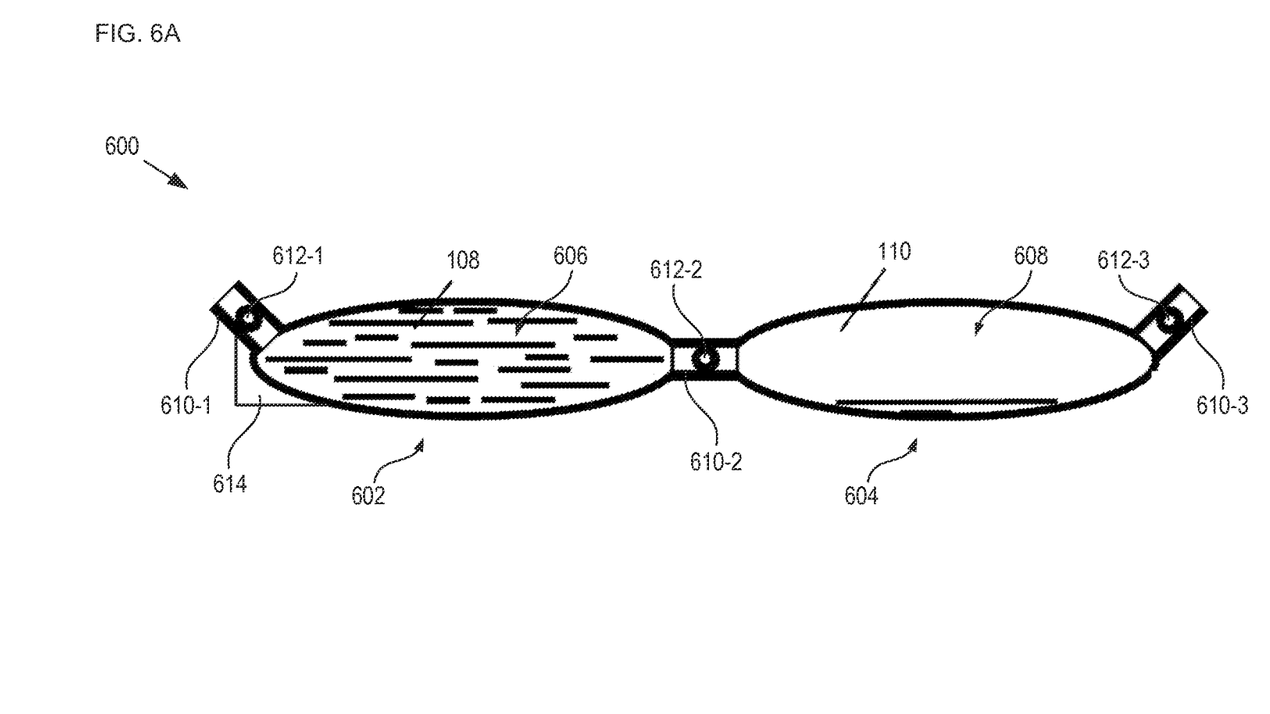
FIG. 6A depicts a schematic drawing of a front view of an optical system in accordance with a second alternative embodiment of the present invention.

FIG. 6A depicts a schematic drawing of a front view of an optical system in accordance with a second alternative embodiment of the present invention. Optical system 600 includes lenses 602 and 604, channels 610-1 through 610-3, valves 612-1 through 612-3, and actuator 614.

Figure 6B:
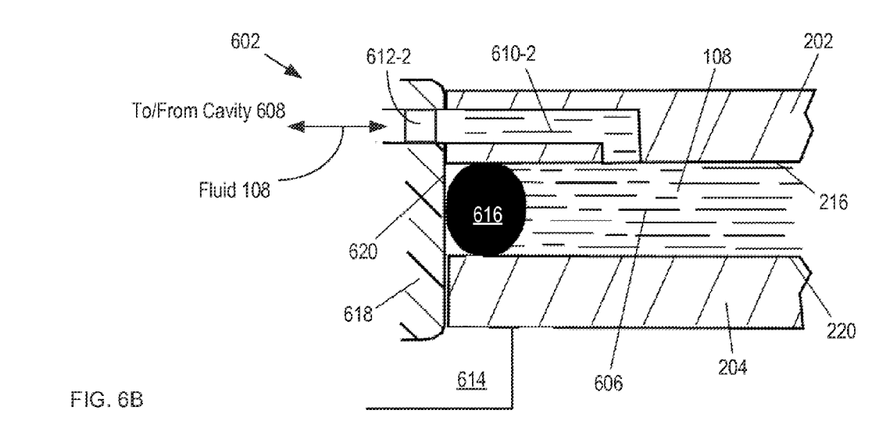
FIGS. 6B and 6C depict a schematic drawing of a cross-sectional view of lens 602, in a large and small volume state, respectively, in accordance with the second alternative embodiment of the present invention.
Figure 6C:
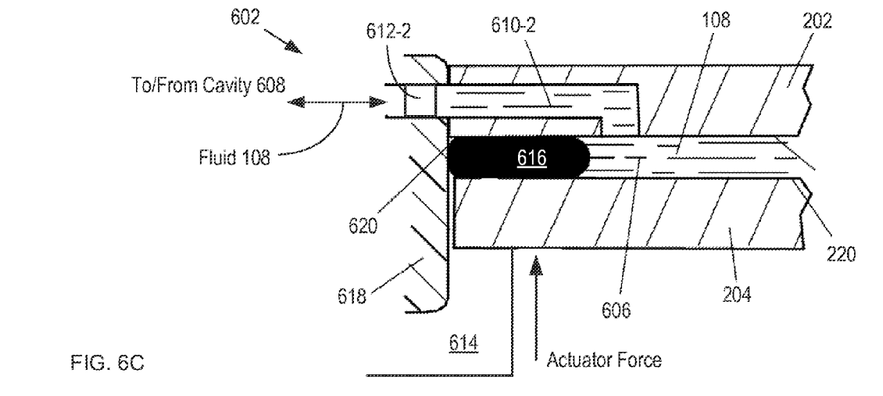

FIGS. 6B and 6C depict a schematic drawing of a cross-sectional view of a portion of lens 602, in a large and small volume state, respectively, in accordance with the second alternative embodiment of the present invention. Lenses 602 and 604 are analogous to lenses 102 and 104, described above; however, lenses 602 and 604 include cavities 606 and 608, respectively, each of whose volume can be changed. Lens 602 includes lens elements 202 and 204, fluid 108, seal 616, rim 618, channel 610-2, and actuator 614. Although not described in detail here, lens 604 includes analogous elements to the elements of lens 602.

Lenses 602 and 604 are coupled through channel 610-2 such that the volume changes of their cavities are complementary. In other words, as fluid 108 flows out of one cavity, it flows into the other by the same amount. In some embodiments, one of lenses 602 and 604 is a fixed-cavity-volume lens and fluid transfers between the variable-cavity lens and a fluid reservoir.

Lens 602 includes lens elements 202 and 204 and seal 616 collectively define variable-volume cavity 606. Lens elements 202 and 204 are described above and with respect to FIG. 2.

Seal 616 is a compliant member having a range of compliance suitable to accommodate the extremes of the desired volume range for cavity 606 of lens 602. Materials suitable for use in seal 616 include, without limitation, rubbers, polymers (e.g., neoprene, etc.), and the like. In some embodiments, seal 616 has a hollow center to reduce the amount of compression force necessary to reduce the size of cavity 606.

Lens 602 is held in position by rim 618, which is analogous to rim 112, described above.

Each of channels 610-1 through 610-3 is a conduit that fluidically couples cavities 606 and 608, thereby enabling flow of fluid 108 between the cavities. As depicted in FIGS. 6B and 6C, channel 610-2 extends through the edge of lens element 202 (i.e., outside the normal vision field of the lens). In some embodiments, channel 610-2 is formed through seal 616. One skilled in the art will recognize, after reading this Specification, that there are many alternative ways to form a channel that fluidically couples cavity 606 within the scope of the present invention.

In FIG. 6B, lens 602 is depicted with cavity 606 at its maximum size (i.e., the separation between surfaces 216 and 220 is at its maximum), and wherein fluid 108 substantially fills the variable-volume cavity. In this state, seal 616 is slightly compressed between surfaces 216 and 220 and rim surface 620 of rim 618.

In FIG. 6C, lens 602 is depicted with cavity 606 at a reduced size. The size of cavity 606 is reduced by actuator 614, which applies a compressive force between lens elements 202 and 204 thereby driving a substantial fraction of fluid 108 from cavity 606 into cavity 608 of lens 604, thereby changing the focal length of lens 604. In this state, seal 616 is substantially compressed between surfaces 216 and 220 as shown.

Upon removal of the actuation force applied by actuator 614, seal 616 provides a restoring force that returns cavity 606 to its uncompressed state (i.e., its state as shown in FIG. 6B).

In some embodiments, additional springs or spring-like elements are included to provide or augment the restoring force on lens 602.

In some embodiments, compression of cavity 606 drives a sufficient amount of fluid 108 to simultaneously fill cavity 608 of lens 604, while still leaving cavity 606 filled with fluid 108, thereby giving each lens a different focal length.

In some embodiments, each of lenses 602 and 604 are fluidically coupled with a different reservoir for fluid 108 and are not fluidically coupled to one another. In such embodiments, the focal length of each lens is independently controllable.

Figure 7:
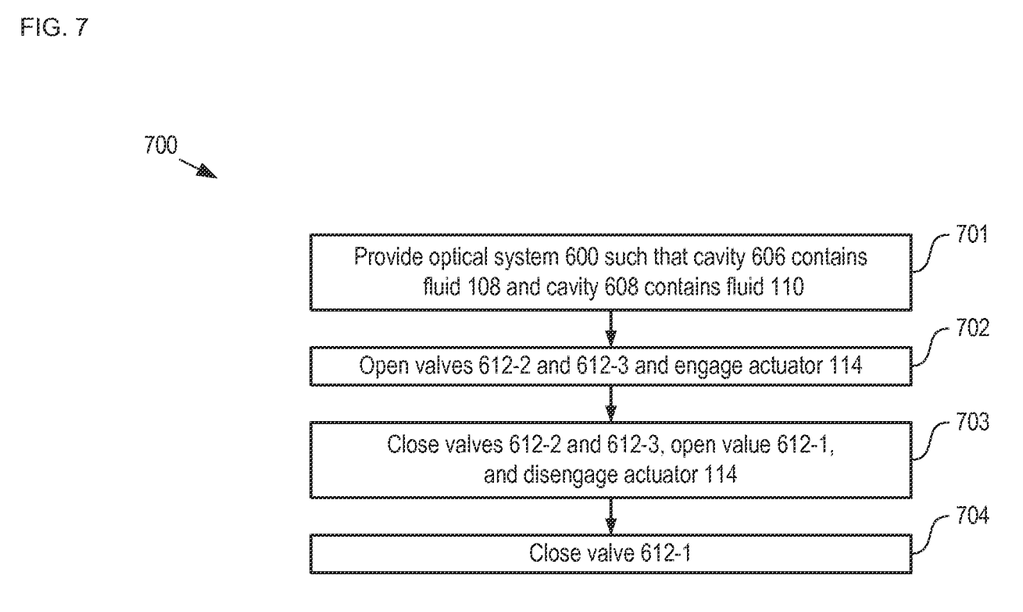
FIG. 7 depicts operations of a method suitable for changing the focal length of optical system 600.

FIG. 7 depicts operations of a method suitable for changing the focal length of optical system 600. Method 700 begins with operation 701, wherein optical system 600 is provided. In its initial state, optical system is provided such that cavity 606 is filled with fluid 108 and cavity 608 is filled with fluid 110, where fluid 110 is air. Furthermore, each of valves 612-1 through 612-3 is closed. In this state, optical system 600 has a focal length, f1, for both lens 602 and 604.

At operation 702, valves 612-2 and 612-3 are opened and actuator 114 is engaged. By virtue of open valve 612-2, cavities 606 and 608 are fluidically coupled by channel 610-2. In similar fashion, open valve 612-3 enables channel 610-3 to fluidically couple cavity 608 with the outside environment.

Actuator 114 is a conventional actuator operative for applying a compressive force between lens elements 202 and 204. Actuators suitable for use with the present invention include, without limitation, mechanical actuators, piezoelectric actuators, electromagnetic actuators, electrostatic actuators, magnetostrictive actuators, and the like.

When engaged, actuator 114 drives fluid 108 from cavity 606 through channel 610-2 into cavity 608 while fluid 110 escapes cavity 608 to the outside environment through channel 610-3. At the completion of operation 702, each of cavities 606 and 608 are filled with fluid 108.

At operation 703, valves 612-2 and 612-3 are closed, valve 612-1 is opened, and actuator 114 is disengaged. By virtue of open valve 612-1, cavity 606 is fluidically coupled to the outside environment via channel 610-1. The restoring force provided by seal 616 expands cavity 606, enabling air from the outside environment (i.e., fluid 110) to enter and fill the cavity.

At operation 704, valve 612-1 is closed. This leaves each of lenses 602 and 604 having a focal length of f2; therefore, optical system 600 has focal length, f2.

One skilled in the art will recognize that the focal length of system 600 can be returned to f1 by a reversal of method 700.

It is another aspect of the present invention that the focal length of a multi-element lens can be changed by transferring fluid between multiple cavities included within the lens. In such embodiments, since no fluid transfers between different lenses, the balance and weight of the optical system does not change when its focal length is changed.

Figure 8A:
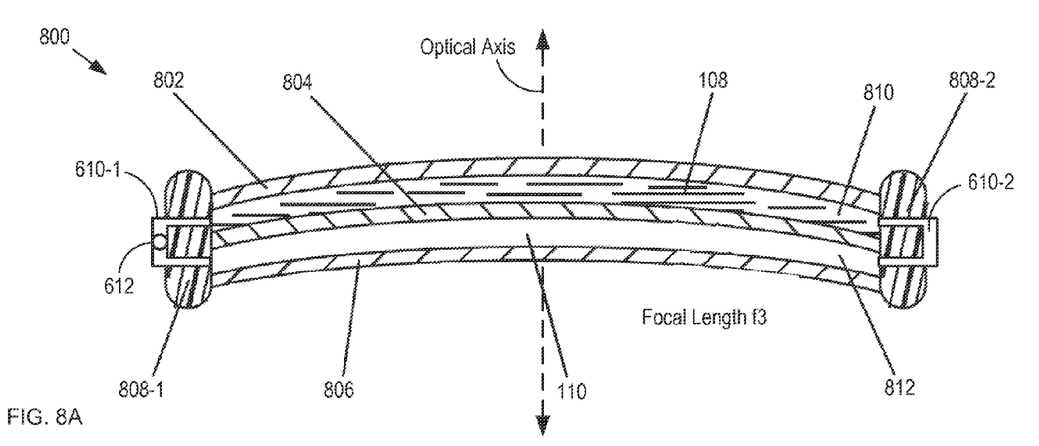
FIGS. 8A-B depict schematic drawings of a multi-element lens in its first and second focal-length states, respectively, wherein the lens includes a plurality of internal cavities in accordance with a third alternative embodiment of the present invention.
Figure 8B:
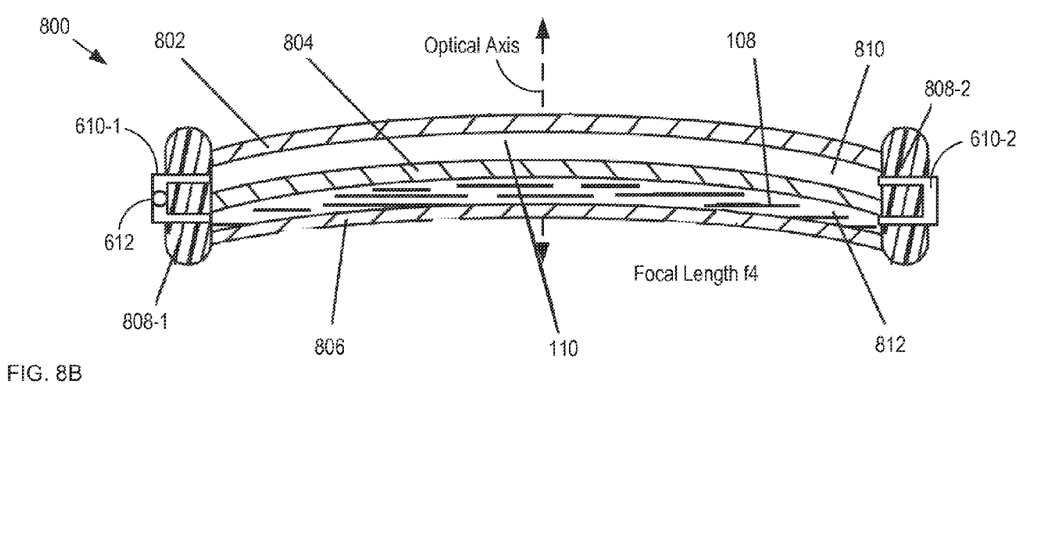

FIGS. 8A-B depict schematic drawings of a multi-element lens in its first and second focal-length states, respectively, wherein the lens includes a plurality of internal cavities in accordance with a third alternative embodiment of the present invention. Lens 800 comprises lens elements 802, 804, and 806, frame elements 808-1 and 808-2, channels 610-1 and 610-2, and valve 612. Lens 800 is suitable for use in any of the embodiments of the present invention. Lens 800 has a focal length that can be changed between two focal lengths, f3 and f4, by moving fluid 108 between its two internal cavities. In some embodiments, lens 800 includes only cavities having fixed volumes. In some embodiments, at least one cavity of lens 800 has a variable volume. In some embodiments, lens 800 includes more than three lens elements and more than two cavities.

Each of lens elements 802, 804, and 806 is a substantially rigid, lightweight, molded plastic lens having a defined focal length and is analogous to the lens elements described above.

Lens elements 802, 804, and frame elements 808-1 and 808-2 collectively define cavity 810.

In similar fashion, lens elements 804, 806, and frame elements 808-1 and 808-2 collectively define cavity 812.

Each of cavities 810 and 812 has a fixed volume.

Frame elements 808-1 and 808-2 (referred to, collectively, as frame elements 808) are analogous to rims 112 described above; however, frame elements 808 provide both mechanical sidewall supports and seals for cavities 810 and 812. Further, frame elements 808 include ports through which channels 610-1 and 610-2 fluidically couple the cavities thereby enabling fluids 108 and 110 to flow between them.

The flow of fluids between cavities 810 and 812 is controlled via valve 612, in similar fashion as described above with respect to method 700. In some embodiments, additional channels and valves enable fluidic coupling with the external environment. In some embodiments, a pump is included to drive fluids 108 and 110 between the cavities. In some embodiments, one or more fluid reservoirs are included in system designs based on lens 800. It will be clear to one skilled in the art, after reading this Specification, how to specify, make, and use conventional micropumps and/or fluid reservoirs suitable for inclusion into embodiments of the present invention.

The lens elements of lens 800 are designed to switch between focal lengths f3 and f4, depending upon which of cavities 810 and 812 contains fluid 108. Specifically, lens elements 802, 804, and 806 are designed with fixed focal lengths F1, F2, and F3, respectively. When filled with fluid 108, cavity 810 has focal length F4. When filled with fluid 110, where fluid 110 is air, cavity 812 does not contribute to the optical power of lens 800.

F1, F2, F3, and F4 are designed such that lens 800 is characterized by first focal length, f3, when cavity 810 is filled with fluid 108, where f3 is determined (again based on the lens maker's equation for thin lenses) as:

$$f3 = \left(\frac{1}{F1} + \frac{1}{F2} + \frac{1}{F3} + \frac{1}{F4}\right)^{-1}. \quad (1)$$

When fluid 108 fills cavity 812 and fluid 110 fills cavity 810, cavity 812 has focal length F5 and cavity 810 does not contribute to the optical power of lens 800. When cavity 812 is filled with fluid 108, therefore, the focal length of lens 800 becomes f4, which is determined as:

$$f4 = \left(\frac{1}{F1} + \frac{1}{F2} + \frac{1}{F3} + \frac{1}{F5}\right)^{-1}. \quad (2)$$

It should be noted that each of focal lengths f3 and f4 are not limited to focal lengths suitable for eyewear. As a result, each of f3 and f4 can have any desired, practical value without departing from the scope of the present invention.

In some embodiments, one or more of the lens elements included in lens 800 includes design features for correction of astigmatism and/or other aberrations.

It is yet another aspect of the present invention that a lens having multiple fixed lens elements that define multiple fluid cavities, where the volume of at least one of the fluid cavities is changeable enables an optical system that can switch between two focal lengths.

In some embodiments, a pair of lenses 800 are mounted in eyeglass frames and fluidically coupled with a different reservoir for fluid 108. In some of these embodiments, the lenses are not fluidically coupled to one another and their focal lengths are independently controllable.

Figure 9A:
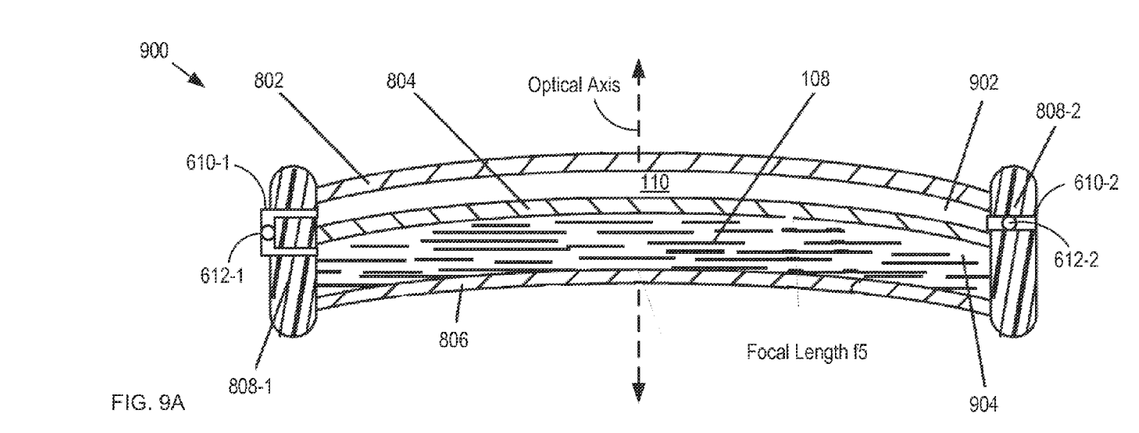
FIGS. 9A-B depict schematic drawings of a multi-element lens in its first and second focal-length states, respectively, wherein the lens comprises a plurality of internal cavities in accordance with a fourth alternative embodiment of the present invention.
Figure 9B:
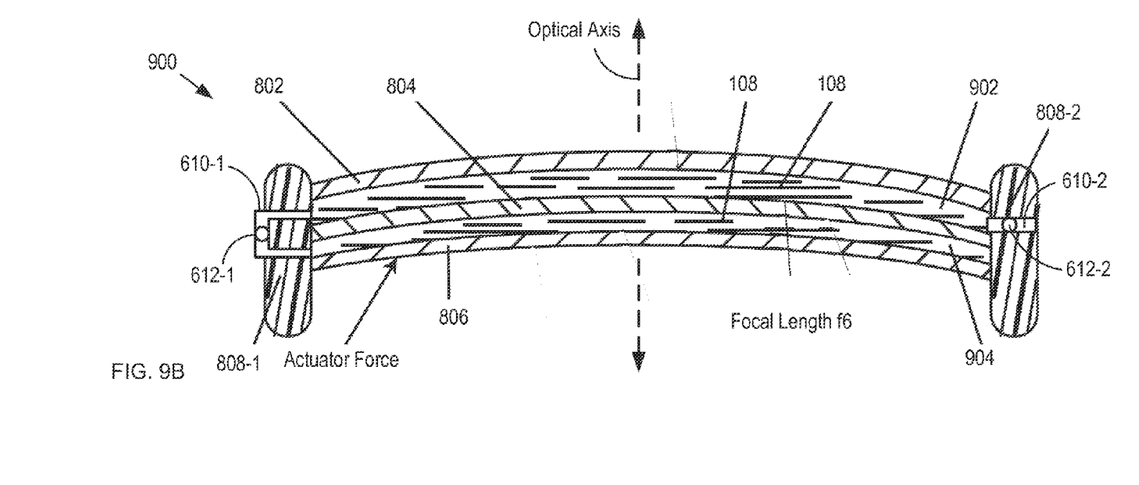

FIGS. 9A-B depict schematic drawings of a multi-element lens in its first and second focal-length states, respectively, wherein the lens comprises a plurality of internal cavities in accordance with a fourth alternative embodiment of the present invention. Lens 900 comprises lens elements 802, 804, and 806, frame elements 808-1 and 808-2, channels 610-1 and 610-2, and valves 612-1 and 612-2. Lens 900 is suitable for use in any of the embodiments of the present invention. Lens 900 has a focal length that can be changed between focal lengths f5 and f6 by changing the volume of one cavity to drive fluid 108 into a second cavity. In some embodiments, lens 900 includes more than three lens elements and more than two cavities.

Lens elements 802, 804, and frame elements 808-1 and 808-2 collectively define cavity 902, which has a fixed volume.

In similar fashion, lens elements 804, 806, and frame elements 808-1 and 808-2 collectively define cavity 904, which has a changeable volume.

Cavity 902 and 904 are connected to each other via channel 610-1. Cavity 902 is also connected to the outside environment via channel 610-2. The flow of fluids through channels 610-1 and 610-2 is controlled via valves 612-1 and 612-2, respectively.

In first lens state, cavity 904 is filled with fluid 108 and cavity 902 is filled with fluid 110 (i.e., air).

As discussed above and with respect to FIG. 8, lens elements 802, 804, and 806 are designed with fixed focal lengths F1, F2, and F3, respectively. When filled with fluid 108, cavity 904 has focal length F7. When filled with fluid 110, cavity 902 does not contribute to the optical power of lens 900.

F1, F2, F3, and F7 are designed such that lens 900 is characterized by first focal length, f5, when cavity 904 is filled with fluid 108, where f5 is determined as:

$$f5 = \left(\frac{1}{F1} + \frac{1}{F2} + \frac{1}{F3} + \frac{1}{F7}\right)^{-1}. \quad (3)$$

To change the focal length of lens 900 from f5 to f6, an actuator (not shown for clarity) applies an actuator force on lens element 806 to reduce the separation of lens elements 804 and 806, thereby reducing the volume of cavity 904. In response, fluid 108 is driven through channel 610-1 (with valve 612-1 open) and into cavity 902. As fluid 108 is driven into cavity 902, fluid 110 is vented from the cavity through channel 610-2 (with valve 612-2 open).

When cavities 902 and 904 are both filled with fluid 108, cavity 902 has a focal length of F8 and, by virtue of its reduced volume, cavity 904 has a focal length of F9. One skilled in the art will recognize that, based on a thin-lens approximation, F9 is substantially equal to F8. As a result, the combined focal length, f6, of lens 900 becomes:

$$f6 = \left(\frac{1}{F1} + \frac{1}{F2} + \frac{1}{F3} + \frac{1}{F8} + \frac{1}{F9}\right)^{-1}. \quad (4)$$

To change the focal length of lens 900 back to f6 from f5, the actuator applies a force on lens element 806 to increase the separation of lens elements 804 and 806, the volume of cavity 904 is increased. As the volume of the variable volume cavity 904 becomes larger, fluid 108 is drawn by suction from the cavity 902. Fluid 110 replaces fluid 108, where fluid 110 is drawn from the external environment into cavity 902 through channel 610-2 (with valve 612-2 open).

In some embodiments, lens 900 has a third focal-length state, wherein both of cavities 902 and 904 are filled with fluid 110. Typically, such embodiments include a reservoir for holding fluid 108 after it has been drawn completely from both cavities. When fluid 110 is air, neither of cavities 902 and 904 contributes to the optical design of lens 900 and its focal length, f7, is determined as simply:

$$f7 = \left(\frac{1}{F1} + \frac{1}{F2} + \frac{1}{F3}\right)^{-1}. \quad (5)$$

It is yet another aspect of the present invention that the fluid distribution within a multi-cavity lens can be passively or manually controlled.

Figure 10A:
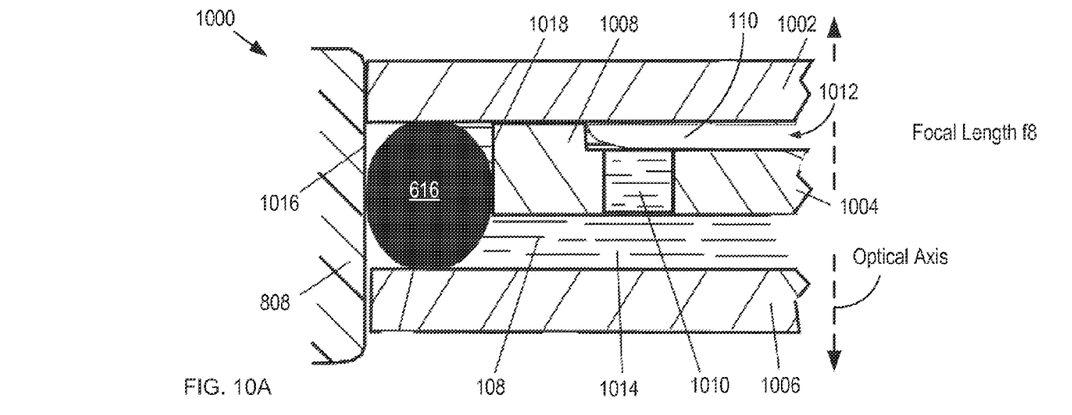
FIGS. 10A-B depict schematic drawings of a portion of a multi-element lens in its first and second focal-length states, respectively, wherein the lens comprises a seal that controls the flow of a fluid between a pair of internal cavities in accordance with a fifth alternative embodiment of the present invention.
Figure 10B:
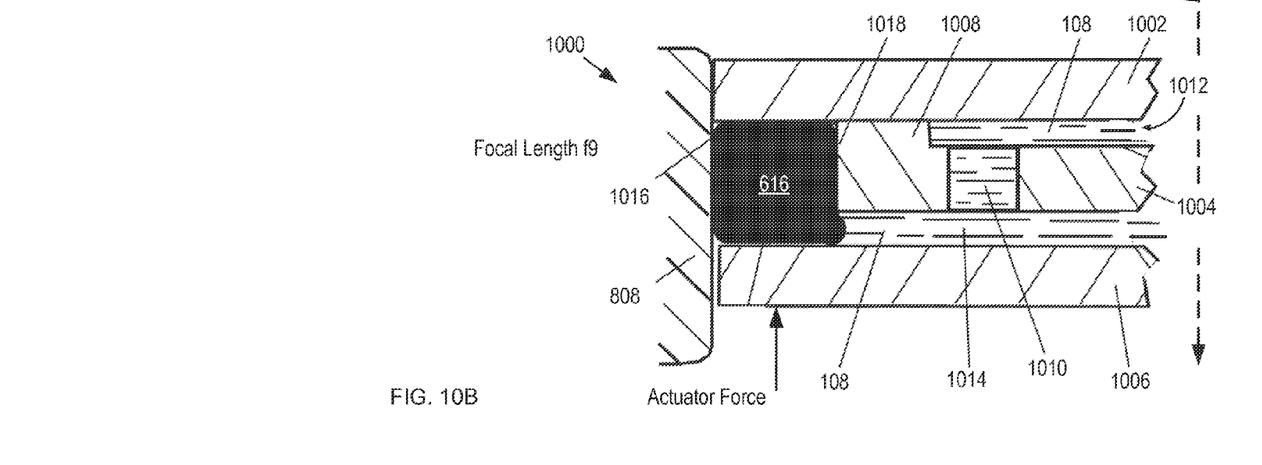

FIGS. 10A-B depict schematic drawings of a portion of a multi-element lens in its first and second focal-length states, respectively, wherein the lens comprises a seal that controls the flow of a fluid between a pair of internal cavities in accordance with a fifth alternative embodiment of the present invention. Lens 1000 comprises lens elements 1002, 1004, and 1006, frame elements 808, and seal 616. Lens 1000 is suitable for use in any multi-cavity-lens embodiment of the present invention. Lens 1000 has a focal length that can be changed between two focal distances (i.e., f8 and f9) by changing the volume of one cavity to drive fluid 108 into a second cavity. In some embodiments, lens 1000 includes more than three lens elements and more than two cavities.

Lens elements 1002, 1004, and 1006 are analogous to lens elements 802, 804, and 806, respectively; however, lens 1004 includes edge protrusion 1008 and one or more channels 1010.

Seal 616 surrounds the circumference of lens elements 1002, 1004, and 1006 such that lens elements 1002 and 1004 and seal 616 collectively define cavity 1012 and lens elements 1004 and 1006 and seal 616 collectively define cavity 1014. Lens element 1006 is movable along the optical axis of lens 1000 such that cavity 1014 has a variable volume.

Rim protrusion 1008 projects above lens element 1008 along the direction of the optical axis of lens 1000, thereby establishing a fixed separation between lens elements 1002 and 1004. As a result, the volume of cavity 1012 is defined by the area of lens element 1004 and the thickness of rim protrusion 1008.

Seal 616 is held within a seat formed by exterior walls 1016 and 1018 of frame element 808 and lens element 1004, respectively, and the interior surfaces of lens elements 1002 and 1006. When lens 1000 is in its focal length f8 state, seal 616 is substantially uncompressed (i.e., in its quiescent state). The thickness of seal 616 along the direction of the optical axis establishes the separation between lens elements 1004 and 1006 and, therefore, determines the volume of cavity 1014.

When lens 1000 is in its focal length f8 state, cavity 1014 has its maximum volume (i.e., the separation between lenses 1004 and 1006 is substantially at a maximum). In this state, fluid 108 fills variable-volume cavity 1014 and fluid 110 (i.e., air) substantially fills fixed-volume cavity 1012. Due to the refractive index of fluid 108, cavity 1014 operates as an additional lens element within lens 1000, as discussed above. This serial combination of lens elements 1002, 1004, and 1006, in conjunction with "lens" 1012, gives rise to a focal length of f8 for lens 1000.

To transition lens 1000 to its focal length f9 state, an actuator force is applied to lens element 1006. As a result, fluid 108 is forced through channel 1010 by the deformation of seal 106, as shown in FIG. 10B. Channel 1010 is formed through the thickness of lens element 1004 and fluidically couples cavities 1012 and 1014. As a result, the air in cavity 1012 is displaced by fluid 108, thereby filling cavity 1012 with fluid 108. Due to the refractive index of fluid 108, cavity 1012 then operates as yet another lens element within lens 1000. The new serial combination of lens elements 1002, 1004, and 1006, in conjunction with "lenses" 1012 and 1014, gives rise to a different focal length for lens 1000—namely, f9.

In some embodiments, an additional reservoir is included for receiving fluid 110 when it is displaced from cavity 1012.

A latching mechanism (not shown) is typically included to keep lens 1000 in its focal length f9 state until the latch is released by the user. When the latch is released, seal 616 decompresses and increases the volume of cavity 1014. This gives rise to a vacuum that draws fluid 110 back into cavity 1012, returning lens 1000 to its focal length f8 state. In some embodiments, additional spring elements are included to augment the restoring force provided by seal 616.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An optical system comprising:
    a first lens element comprising a first cavity, the first lens element having a first focal length that has a first value when the first cavity contains a first fluid and a second value when the first cavity is first-fluid free; and
    a second lens element comprising a second cavity, the second lens element having a second focal length that has a third value when the second cavity contains the first fluid and a fourth value when the second cavity is first-fluid free, and wherein the fourth value is based on the first value, and further wherein the third value is based on the second value;
    wherein the first cavity and second cavity are non-contiguous and are fluidically coupled such that first fluid can transfer between them.

2. The optical system of claim 1, wherein the first value and the fourth value are equal.

3. The optical system of claim 2, wherein the second value and third value are equal.

4. The optical system of claim 1, further comprising:
    a first lens having a first optical axis, wherein the first lens includes the first lens element; and
    a second lens having a second optical axis, wherein the second lens includes the second lens element.

5. The optical system of claim 1, further comprising a first lens having a first optical axis, wherein the first lens includes the first lens element and the second lens element, and wherein the first lens element and second lens element are arranged serially along the first optical axis, and further wherein the first lens has a third focal length that is based on the first focal length and second focal length.

6. The optical system of claim 5, wherein the third focal length has a fifth value when the first cavity contains the first fluid and the second cavity is first fluid free and a sixth value when the first cavity is first-fluid free and the second cavity contains the first fluid.

7. The optical system of claim 5, wherein the third focal length has a fifth value when the first cavity contains the first fluid and the second cavity is first fluid free and a sixth value when the first cavity is first-fluid free and the second cavity is first-fluid free.

8. The optical system of claim 5, wherein the third focal length has a fifth value when the first cavity contains the first fluid and the second cavity is first fluid free and a sixth value when the first cavity contains the first fluid and the second cavity contains the first fluid.

9. The optical system of claim 8, wherein the first cavity has a controllable volume, and wherein the amount of first fluid in the second cavity is based on the volume of the first cavity.

10. The optical system of claim 9, further comprising a seal that is resilient and compressible, wherein the seal is operative for driving first fluid from the first cavity into the second cavity when the seal is compressed from its quiescent state.

11. An optical system comprising:
    a first lens comprising a first plurality of lens elements that collectively define a first cavity, the first lens having a first optical axis, wherein the first lens has a first focal length when the first cavity contains a first fluid and a second focal length when the first cavity is first-fluid free;
    a second lens comprising a second plurality of lens elements that collectively define a second cavity, the second lens having a second optical axis that is different than the first optical axis, wherein the second lens has a third focal length when the second cavity contains the first fluid and a fourth focal length when the second cavity is first-fluid free, and wherein the fourth focal length is based on the first focal length, and further wherein the third focal length is based on the second focal length; and
    a first conduit that is operative for conveying the first fluid between the first cavity and second cavity.

12. The optical system of claim 11, wherein the first focal length is equal to the fourth focal length.

13. The optical system of claim 12, wherein the second focal length is equal to the third focal length.

14. The optical system of claim 11, wherein the first cavity has a controllable volume, and wherein the amount of the first fluid in the second cavity is based on the volume of the first cavity.

15. The optical system of claim 11, further comprising a second conduit that is operative for conveying a second fluid between the first cavity and second cavity, wherein the first lens has the second focal length when the first cavity contains the second fluid, and wherein the second lens has the fourth focal length when the second cavity contains the second fluid.

16. The optical system of claim 15, wherein the first focal length is equal to the fourth focal length and the second focal length is equal to the third focal length.

17. A method for controlling the focal length of an optical system, the method comprising:
    providing a first lens element comprising a first cavity, the first lens element having a first focal length that has a first value when the first cavity contains a first fluid and a second value when the first cavity is first-fluid free;

providing a second lens element comprising a second cavity that is fluidically coupled with the first cavity such that the first fluid can transfer between them, the second lens element having a second focal length that has a third value when the second cavity contains the first fluid and a fourth value when the second cavity is first-fluid free, and wherein second lens element is provided such that (1) the fourth value is based on the first value and (2) the third value is based on the second value; and controlling the amount of the first fluid contained in each of the first cavity and second cavity.

18. The method of claim 17, wherein the first lens element and second lens elements are provided such that the first value equals the fourth value and the second value equals the third value.

19. The method of claim 17 wherein the first and second cavity are fluidically coupled such that transfer of the first fluid between them is enabled by gravity.

20. The method of claim 17 further comprising:
providing a first lens that contains the first lens element, the first lens having a first optical axis, wherein the first lens has a third focal length that is based on the first focal length; and providing a second lens that contains the second lens element, the second lens having a second optical axis that is different than the first optical axis, wherein the second lens has a fourth focal length that is based on the second focal length.

21. The method of claim 17 further comprising providing a first lens that contains the first lens element and the second lens element, the first lens element and second lens element being arranged serially along a first optical axis, wherein the first lens has a third focal length that is based on the first focal length and the second focal length.

22. The method of claim 21 further comprising:
providing the first lens such that the first cavity has a controllable volume; and
controlling the volume of the first cavity to control the amount of first fluid in the second cavity.

23. The method of claim 22 further comprising:
providing the first lens such that the volume of the first cavity is based on the compression of a seal; and
controlling the compression of the seal to control the amount of first fluid in the second cavity.

* * * * *